(12) United States Patent
Qian

(10) Patent No.: US 12,518,579 B2
(45) Date of Patent: Jan. 6, 2026

(54) INTELLIGENT LOCK AND USE METHOD THEREOF

(71) Applicant: U-tec Group Inc., Union City, CA (US)

(72) Inventor: Lingling Qian, Union City, CA (US)

(73) Assignee: U-TEC GROUP INC., Union City, CA (US)

( * ) Notice: Subject to any disclaimer, the term of this patent is extended or adjusted under 35 U.S.C. 154(b) by 307 days.

(21) Appl. No.: 18/214,725

(22) Filed: Jun. 27, 2023

(65) Prior Publication Data

US 2025/0005981 A1 Jan. 2, 2025

(51) Int. Cl.
*G07C 9/00* (2020.01)
*G06V 40/10* (2022.01)

(52) U.S. Cl.
CPC .......... *G07C 9/00563* (2013.01); *G06V 40/11* (2022.01); *G07C 9/00944* (2013.01); *G07C 2209/65* (2013.01)

(58) Field of Classification Search
CPC ............ G07C 9/00563; G07C 9/00944; G07C 2209/65; G06V 40/11
See application file for complete search history.

(56) References Cited

U.S. PATENT DOCUMENTS

| | | | |
|---|---|---|---|
| 2015/0063661 A1* | 3/2015 | Lee | H04L 63/0861 382/124 |
| 2016/0183812 A1* | 6/2016 | Zhang | G07C 9/37 600/301 |
| 2018/0044942 A1* | 2/2018 | Li | E05B 47/00 |
| 2018/0209183 A1* | 7/2018 | Ham | G07C 9/00817 |

OTHER PUBLICATIONS

Design of dual-model embedded finger vein and texture on dorsal recognition auto-guard system Chen et al. Apr. 2021.*
Biometric authentication systems based on hand pattern vein, digital certificates and smart cards Kalam et al. May 2013.*

* cited by examiner

*Primary Examiner* — Christopher S Kelley
(74) *Attorney, Agent, or Firm* — CARTER, DELUCA & FARRELL LLP

(57) ABSTRACT

An intelligent lock and use method thereof is provided, where the intelligent lock includes a lock body, a main controller, a hand dorsum vein recognition module and a lock drive module; the main controller is connected to the hand dorsum vein recognition module and the lock drive module; the lock drive module is further connected to the lock body; the hand dorsum vein recognition module is configured to acquire an image of a hand dorsum vein of a target subject at a predetermined angle obliquely downward and recognize the image, so as to obtain target vein feature data; the main controller is configured to match the target vein feature data with recorded vein feature data to obtain a matching result; the matching result comprises successful match and failed match; the lock drive module is configured to drive the lock body to unlock in case of successful match.

16 Claims, 6 Drawing Sheets

INTELLIGENT LOCK AND USE METHOD THEREOF

TECHNICAL FIELD

The present disclosure relates to the technical field of intelligent locks, and in particular to an intelligent lock and use method thereof.

BACKGROUND

For convenience and practicality, the existing intelligent lock generally adds fingerprint, face, finger vein, and palm vein recognition functions to facilitate the user to quickly unlock. However, fingerprint is a "contact" identification method, and its "surface feature" attribute makes the fingerprint feature easily contaminated (such as by sweat, drying, peeling, etc.), which cannot satisfy all people, especially for the elderly and children. Secondly, the fingerprint information of the user is easy to be captured, which brings hidden danger to the security of the whole house. The face module has high power consumption, poor height compatibility, and is susceptible to outdoor light interference in daytime, thus not suitable for direct use in outdoor and semi-outdoor environments. Some face locks now also have "palm" vein recognition function, but because consumers do not know how to correctly place the palm, the recognition process takes a long time, and the face locks are not suitable for use in outdoor and semi-outdoor environments either. In recent years, the finger vein has been used by manufacturers. For aesthetics and protection, the finger vein basically adopts the vertical back-illumination acquisition scheme, which is difficult for the consumers to correctly place the finger at one time, and unfriendly to use. Further, a back-illumination light source is also susceptible to outdoor light interference.

SUMMARY

An objective of some embodiments of the present disclosure is to provide an intelligent lock and use method thereof, so as to improve ease of use of the intelligent lock.

To achieve the above objective, the present disclosure adopts the following technical solutions.

An intelligent lock, including a lock body, a main controller, a hand dorsum vein recognition module and a lock drive module; the main controller is connected to the hand dorsum vein recognition module and the lock drive module; the lock drive module is further connected to the lock body;

the hand dorsum vein recognition module is configured to acquire an image of a hand dorsum vein of a target subject at a predetermined angle obliquely downward and recognize the image, so as to obtain target vein feature data;

the main controller is configured to match the target vein feature data with recorded vein feature data to obtain a matching result; the matching result includes a successful match and a failed match;

the lock drive module is configured to drive the lock body to unlock in case of the successful match.

A use method of an intelligent lock applied to the above intelligent lock, including:

placing the hand dorsum naturally in the acquisition space of the intelligent lock;

acquiring and recognizing, by the hand dorsum vein recognition module, the image of the hand dorsum vein, so as to obtain the target vein feature data;

matching, by the main controller, the target vein feature data with the recorded vein feature data to obtain the matching result;

driving, by the lock drive module, the lock body to unlock in case of the successful match.

According to specific embodiments of the present disclosure, the present disclosure discloses the following technical effects.

In the intelligent lock according to the present disclosure, an angle of the hand dorsum vein recognition module is set, so that the user only needs to naturally place the hand in the acquisition space and gently lift the hand dorsum to adjust the distance, so as to realize the acquisition and recognition of the image of hand dorsum vein, which is convenient to use. Compared with fingerprint recognition, the vein feature used in the present disclosure is not easily contaminated. Further, compared with face recognition, the present disclosure weakens the problem of height compatibility, and compared with palm and finger vein recognition, the hand dorsum placement position of the present disclosure is more flexible and the recognition effect is better. Therefore, the intelligent lock according to the present disclosure has improved ease of use.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can be derived from these accompanying drawings by those of ordinary skill in the art without creative efforts.

Figure 1:
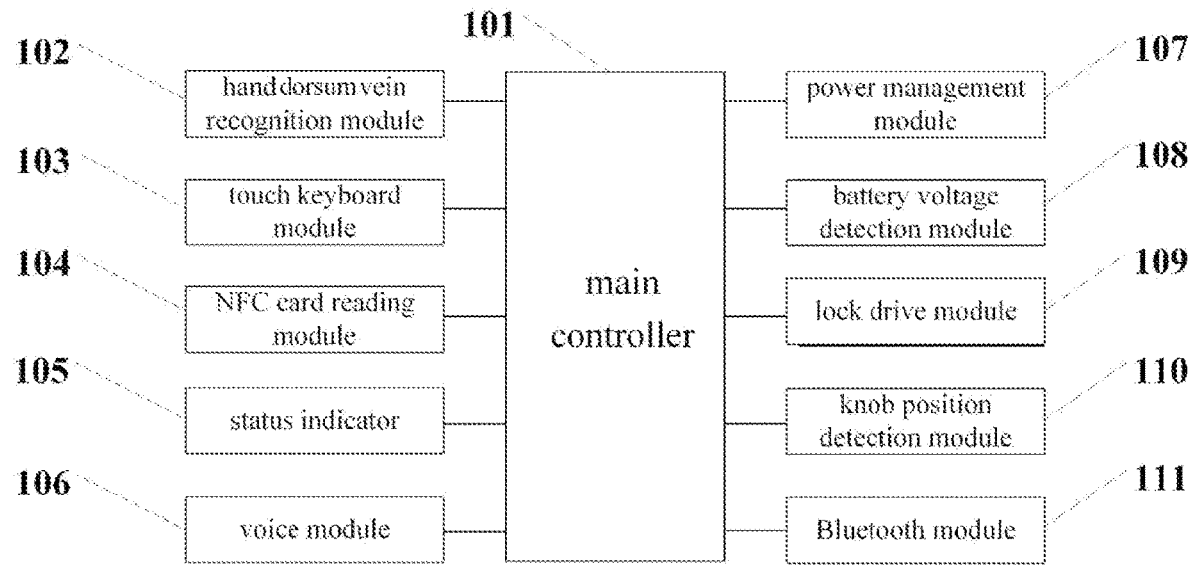
FIG. 1 is a structural diagram of modules of an intelligent lock according to the present disclosure.

REFERENCE NUMERALS main controller—101, hand dorsum vein recognition module—102, touch keyboard module—103, NFC card reading module—104, status indicator—105, voice module—106, power management module—107, battery voltage detection module—108, lock drive module—109, knob position detection module—110, Bluetooth module—111, processing unit—201, acquisition unit—202, imaging light source—203, light equalizing assembly—204, light filtering component—205, first side surface—301, elevation—angled interaction surface—302, depression—angled acquisition surface—303, second side surface—304, and proximity sensor—305.

DETAILED DESCRIPTION OF THE EMBODIMENTS

The technical solutions in the embodiments of the present disclosure will be described below clearly and completely with reference to the accompanying drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts shall fall within the protection scope of the present disclosure.

An objective of some embodiments of the present disclosure is to provide an intelligent lock and use method thereof, so as to improve ease of use of the intelligent lock.

To make the above-mentioned objective, features, and advantages of the present disclosure clearer and more comprehensible, the present disclosure will be further described in detail below in conjunction with the accompanying drawings and specific implementations.

As shown in FIG. 1, an intelligent lock according to the present disclosure includes a lock body, a main controller 101, a hand dorsum vein recognition module 102, and a lock drive module 109; the main controller 101 is connected to the hand dorsum vein recognition module 102 and the lock drive module 109; the lock drive module 109 is further connected to the lock body.

The hand dorsum vein recognition module 102 is configured to acquire an image of a hand dorsum vein of a target subject obliquely downward at a predetermined angle and recognize the image, so as to obtain target vein feature data; the main controller 101 is configured to match the target vein feature data with recorded vein feature data to obtain a matching result; the matching result includes a successful match and a failed match; the lock drive module 109 is configured to drive the lock body to unlock in case of the successful match. Optionally, the predetermined angle is a depression-angled of 150°.

Further, the intelligent lock further includes a battery and a circuit board powered by the battery; the main controller 101, the hand dorsum vein recognition module 102, and the lock drive module 109 are provided on the circuit board. In addition, the circuit board is further provided with a touch keyboard module 103, an NFC card reading module 104, a status indicator 105, a voice module 106, a power management module 107, a battery voltage detection module 108, a knob position detection module 110, a Bluetooth module 111, and a debugging port, which are connected to the main controller 101, so as to implement respective functions. The status indicator 105 is configured to indicate the operation status of the intelligent lock, the information of the recognition result of the hand dorsum vein, and the like.

Figure 2:
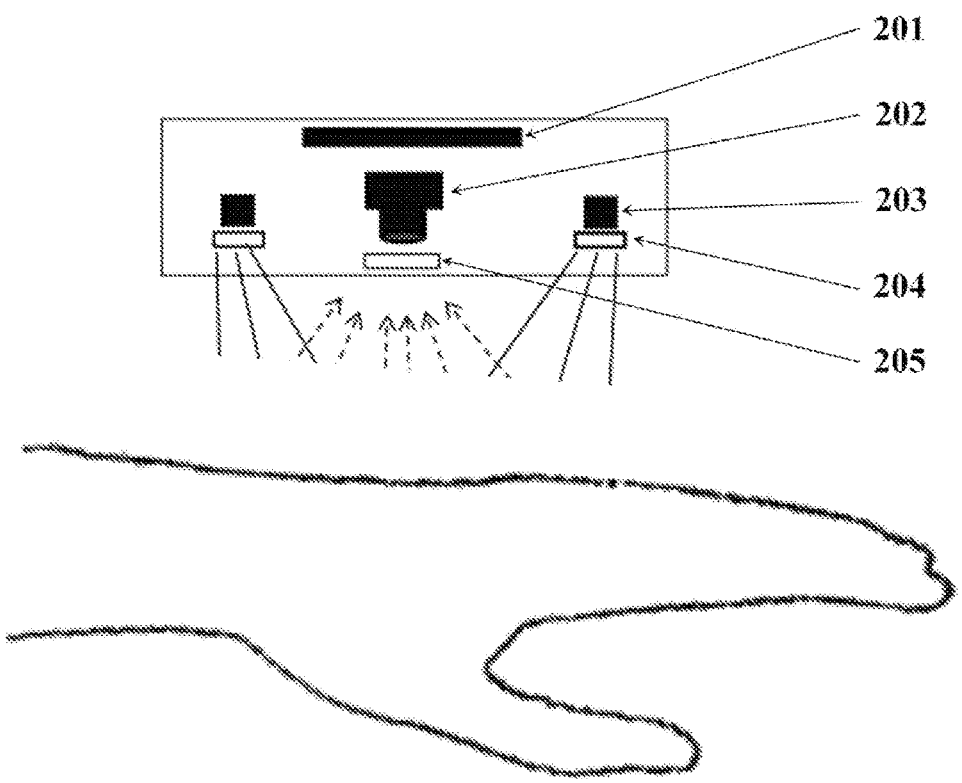
FIG. 2 is a structural diagram of a hand dorsum vein recognition module of the intelligent lock according to the present disclosure.

The hand dorsum vein recognition module 102 specifically adopts a down-illuminated hand dorsum vein recognition device capable of resisting natural light interference and maintaining stability of the device performance. As shown in FIG. 2, the hand dorsum vein recognition module 102 includes an imaging light source 203, an acquisition unit 202, a light filtering component 205, and a processing unit 201. The imaging light source 203 is configured to emit light of predetermined wavelengths to illuminate a hand dorsum of the target subject; the acquisition unit 202 is configured to acquire the image of the hand dorsum vein of the target subject obliquely downward at the predetermined angle; the light filtering component 205 is positioned below the acquisition unit and configured to filter light of non-imaging wavelengths; the processing unit 201 is connected to the imaging light source 203, the acquisition unit 202, and the main controller 101, and is configured to control the imaging light source 203 to emit light, and is further configured to recognize the image of the hand dorsum vein of the target subject to obtain the target vein feature data.

Optionally, the predetermined wavelengths include 760 nm and 960 nm; the light filtering component 205 is a narrow-band near-infrared-transmitting filtering component. Among them, the light of 760 nm wavelength is favorable for absorption of reduced hemoglobin, and the light of 960 nm wavelength is favorable for absorption of oxygenated hemoglobin and weak in natural spectrum.

Further, the hand dorsum vein recognition module 102 further includes a light equalizing assembly 204; the light equalizing assembly 204 is disposed in the light emission direction of the imaging light source 203, and configured for enabling light of a predetermined wavelength emitted by the imaging light source 203 to be uniformly incident to a predetermined acquisition space. As a specific implementation, two imaging light sources 203 and two light equalizing assemblies 204 are provided, the two imaging light sources 203 are symmetrically provided on both sides of the acquisition unit 202, and the two light equalizing assemblies 204 are respectively provided below the two imaging light sources 203. In addition, the imaging light source 203 may have many other combinations so that for hand dorsum at different spatial locations, its vein can be clearly imaged.

Vein recognition is a kind of biometric recognition. In vein recognition, the imaging information of a finger, palm and hand dorsum vein under near infrared with special wavelengths is obtained by a camera module, the feature of imaging information is extracted through using advanced filtering, image binarization and refining technologies, and is compared and matched with vein eigenvalues stored in the system through using a complex matching algorithm, so as to identify and confirm the identity of an individual. However, the existing vein recognition technology always faces a difficult problem, that is, when the natural light or other near infrared radiance is high, the vein information of imaging will be interfered and contaminated, which will seriously affect the vein recognition effect, resulting in that the recognition accuracy is reduced or even recognition is disabled. In the present disclosure, a narrow-band near infrared-transmitting filtering component is provided to filter light of non-imaging wavelengths, and 760 nm and 960 nm near-infrared bands which are low in light intensity and favorable for vein absorption in sunlight are used as an imaging light source, so that clear vein image can be acquired while avoiding sunlight interference, thereby improving the vein recognition effect.

Figure 3:
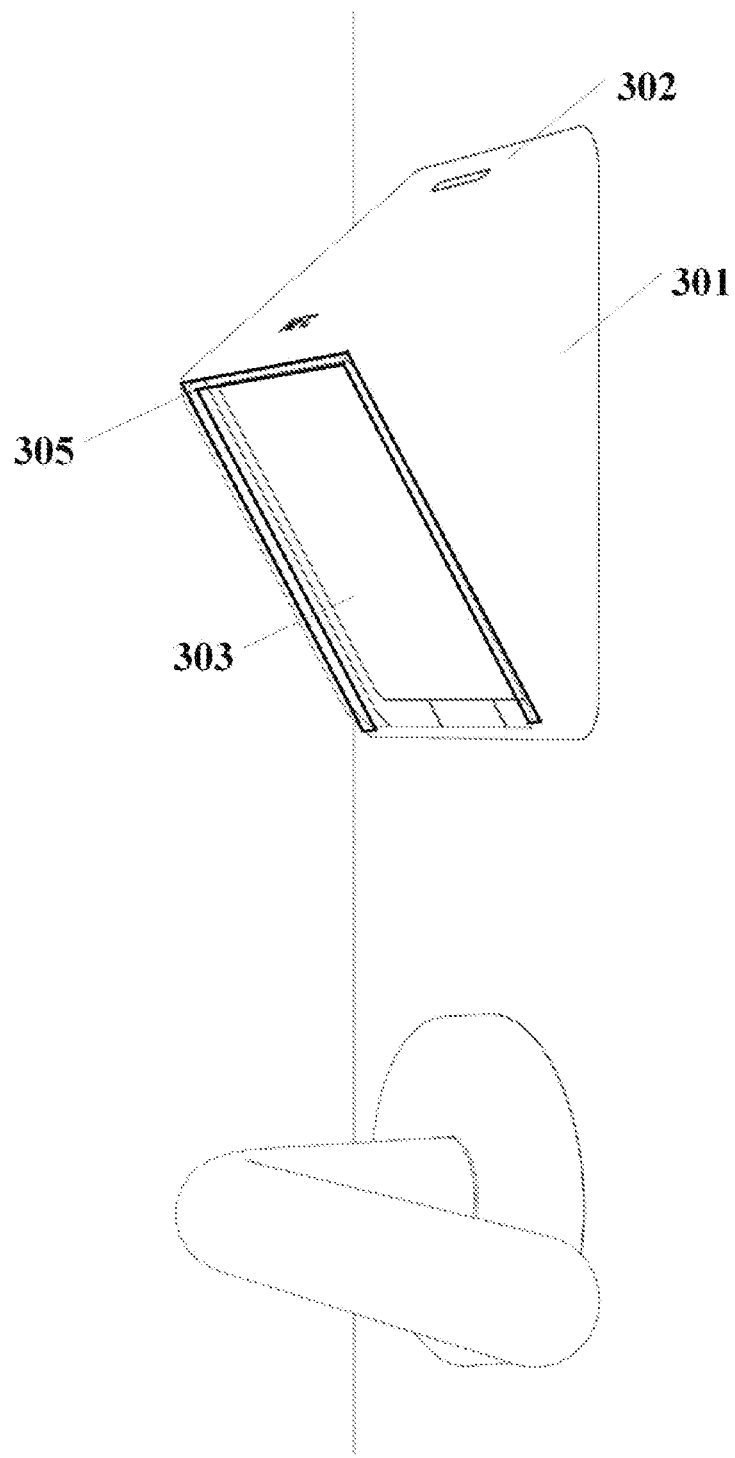
FIG. 3 is a schematic diagram of installation of the intelligent lock according to the present disclosure.
Figure 4:
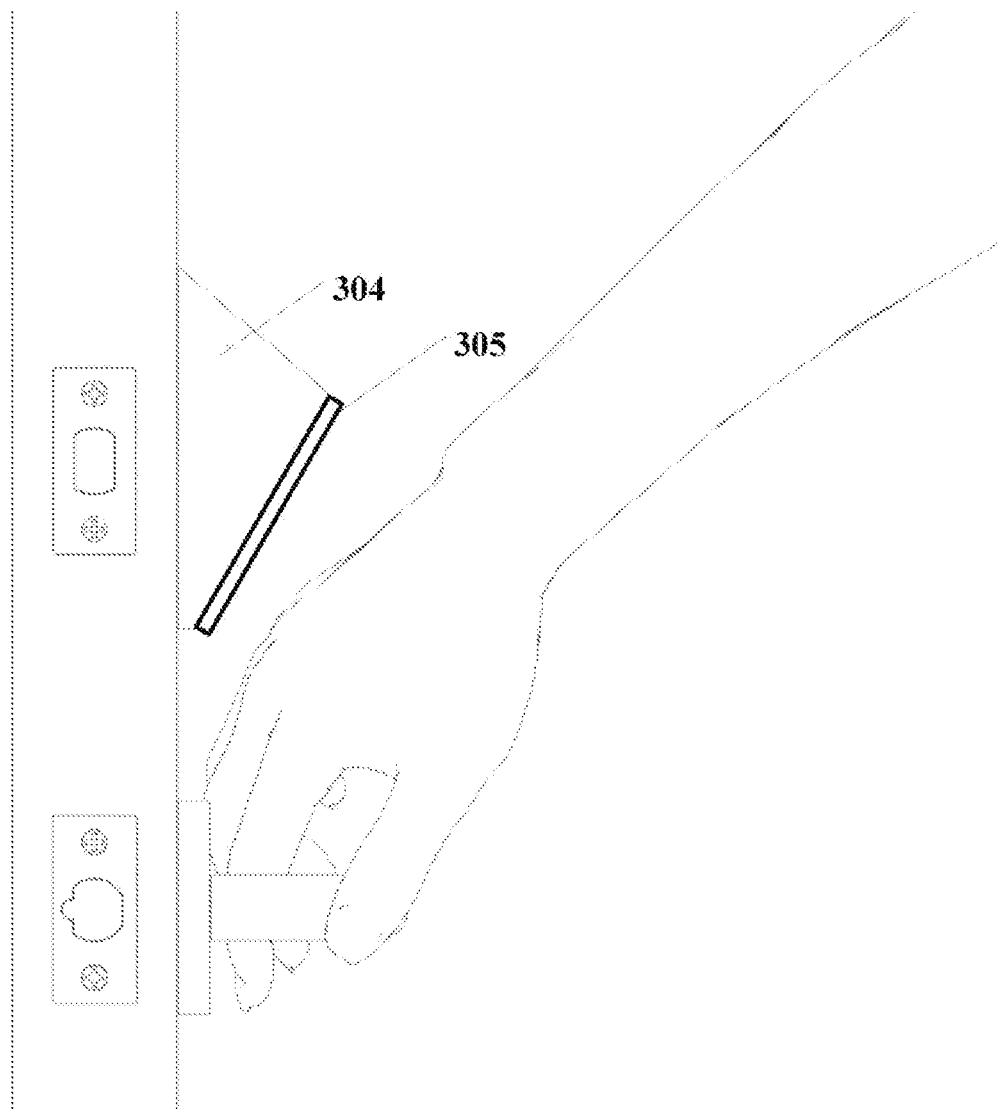
FIG. 4 is a schematic diagram of use of the intelligent lock according to the present disclosure.

Further, the intelligent lock further includes a housing; the main controller 101, the hand dorsum vein recognition module 102, and the lock drive module 109 are positioned within the housing. As shown in FIGS. 3 and 4, the housing includes a first side surface 301, a second side surface 304, an elevation-angled interaction surface 302, and a depression-angled acquisition surface 303.

The first side surface 301, the second side surface 304, and the elevation-angled interaction surface 303 are fixed onto a door; the first side surface 301 is opposite to the second side surface 304, and the first side surface 301 and the second side surface 304 are joined with the elevation-angled interaction surface 302 and the depression-angled acquisition surface 303, respectively; the elevation-angled interaction surface 302 is joined with the depression-angled acquisition surface 303, the first side surface 301, and the second side surface 304, and an elevation angle of the elevation-angled interaction surface 302 (i.e., an angle in an upward direction between the elevation-angled interaction surface 302 and the door) is 130°; the depression-angled acquisition surface 303 is joined with the elevation-angled interaction surface 302, the first side surface 301, and the second side surface 304, and a depression angle of the depression-angled acquisition surface 303 (that is, an angle in a downward direction between the depression-angled acquisition surface 303 and the door) is 150°.

Further, the depression-angled acquisition surface 303 is rectangular in shape, the short side thereof is joined with the elevation-angled interaction surface 302, and the two long sides thereof are joined with the first side surface 301 and the second side surface 304, respectively. Specifically, the depression-angled acquisition surface 303 is 64 mm in width and 68 mm in length.

As a specific implementation, the depression-angled acquisition surface 303 is an infrared-transmitting sealing plate, which can be waterproof, dust-proof and mosquito-proof, protect the internal circuit board from being eroded, and improve the stability of the equipment.

As a specific implementation, the elevation-angled interaction surface 302 includes a touch keyboard module 103 and an NFC card reading module 104; the touch keyboard module 103 and the NFC card reading module 104 are connected to the main controller 101.

In this embodiment, a 150° depression-angled acquisition window is configured to adapt to the natural placement state of a hand dorsum of a user of 1.5-2.0 m height, and a 130° elevation-angled interaction interface is configured to facilitate information interaction such as temporary password inputting and NFC card reading. In addition, the present disclosure also provides a 110° compatible recognition range for interaction among left, middle, right positions.

Further, the intelligent lock further includes a proximity sensor 305; the proximity sensor 305 is positioned on the depression-angled acquisition surface 303, connected to the hand dorsum vein recognition module 102, and configured to sense whether a hand dorsum is placed in the acquisition space and detect a distance to the hand dorsum; the acquisition space is determined by positions and angles of the hand dorsum vein acquisition module 102 and the depression-angled acquisition surface 303. The processing unit 201 specifically controls the imaging light source 203 to emit light when the hand dorsum is placed in the acquisition space and the distance to the hand dorsum is within a predetermined threshold range by detecting/monitoring/processing the information acquired by the proximity sensor 305, and operates the acquisition unit 202 to acquire vein imaged data and perform vein recognition by data processing. Optionally, the proximity sensor 305 is any one of an optical sensor, a capacitive levitated induction sensor, and a range sensor.

Figure 5:
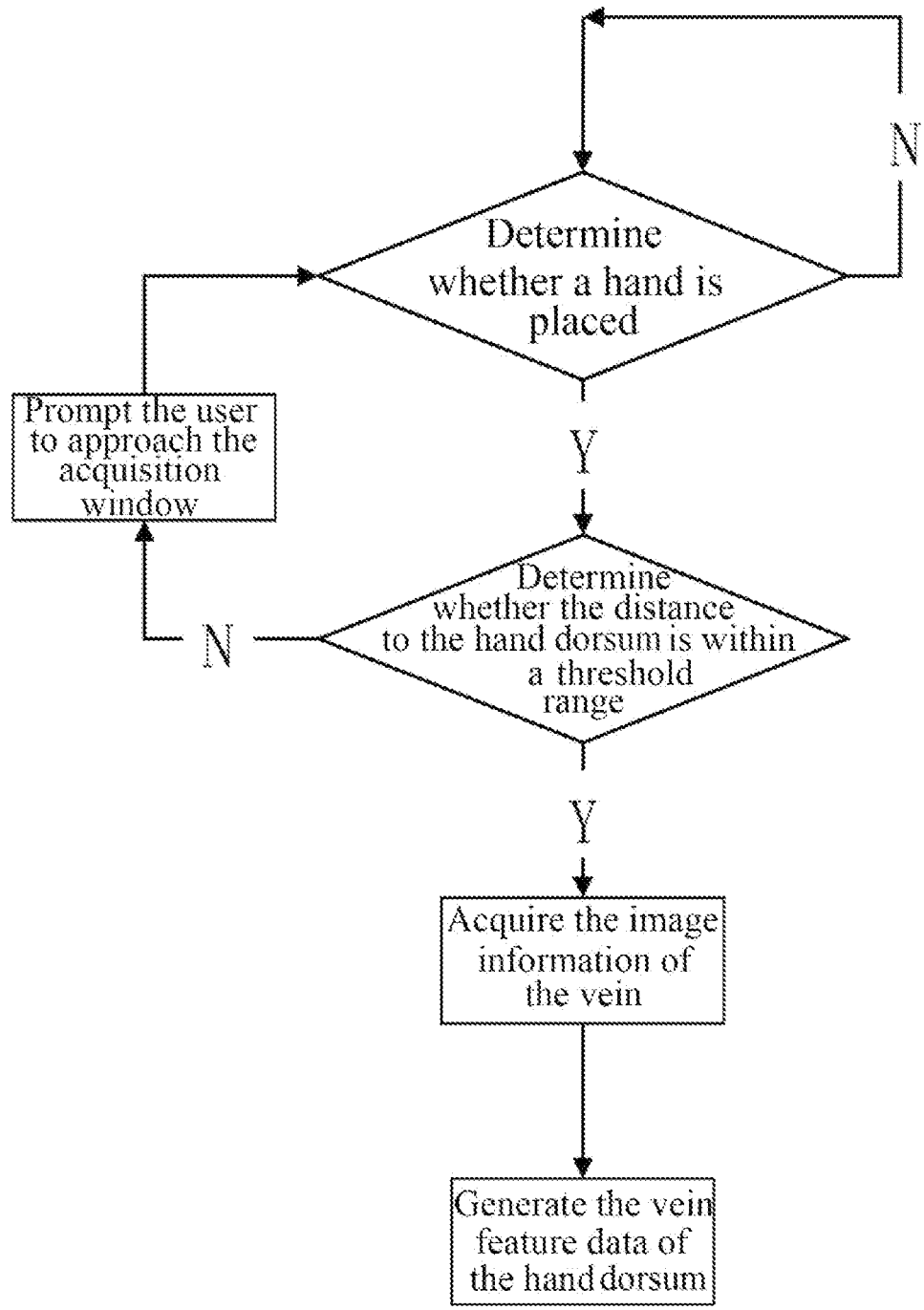
FIG. 5 is a flow chart of operation of the intelligent lock according to the present disclosure.

A workflow of the intelligent lock according to the present disclosure is shown in FIG. 5, including the following steps 1-5.

In step 1, a user places the hand in a predetermined acquisition space to trigger the proximity sensor.

In step 2, the processing unit processes data acquired by the proximity sensor, and starts the acquisition unit.

In step 3, if a distance between the placement position of the hand dorsum and the acquisition unit is within a first predetermined threshold range and a plane parallelism of a window of the acquisition unit is less than a second predetermined threshold, the acquisition unit acquires image information of the hand dorsum vein at this time; otherwise, the user is prompted to approach the acquisition window.

In step 4, after the acquisition unit acquires the image information of the hand dorsum vein, the processing unit processes the image information acquired by the acquisition unit to obtain vein feature data of the user.

In step 5, when the device is in a verification process, the vein feature data of the user is matched with the recorded vein feature data, if matched, the user is confirmed to be an user corresponding to the recorded data; otherwise, the verification fails; when the device is in a recording process, the vein feature data of the user is recorded into the user information for storage.

In this embodiment, the proximity sensor is used to trigger the hand dorsum vein recognition module. The hand dorsum vein recognition module is generally in a dormant state, and only works normally after being triggered by the proximity sensor, so that the overall power consumption of the intelligent lock can be significantly reduced.

Figure 6:
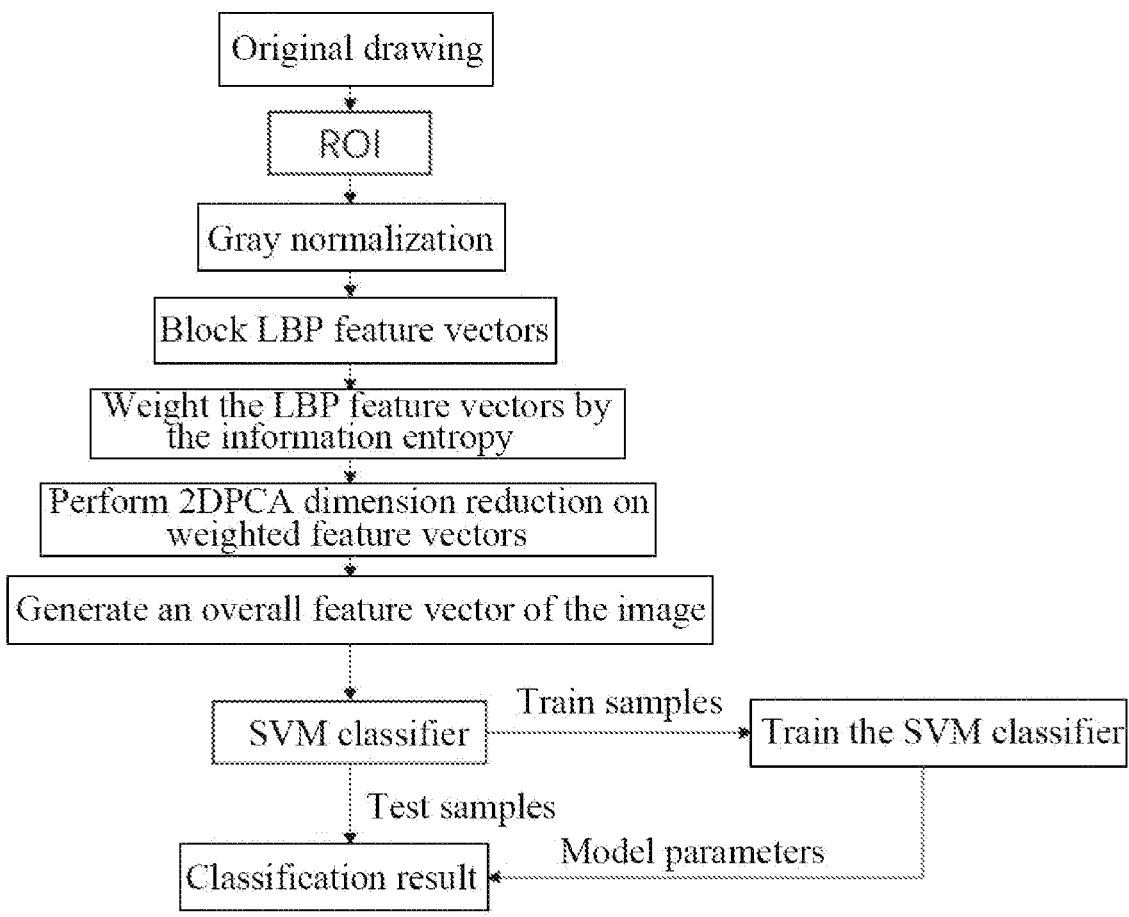
FIG. 6 is a flowchart of a vein feature extraction and recognition method according to the present disclosure.

The basic flow of vein recognition includes image acquisition, preprocessing, feature extraction and feature recognition, where the feature extraction and the feature recognition are critical technical steps. The present disclosure also provides a specific method of vein feature extraction and recognition, as shown in FIG. 6.

For venous feature extraction, local feature extraction is a commonly adopted algorithm in traditional technology. Local Binary Pattern (LBP) is a local texture feature extraction algorithm proposed by T. Ojala et al in 1994. LBP algorithm has the advantages of gray invariance and rotation invariance, fast calculation speed and good robustness. When the illumination changes unevenly, the size relationship among the pixels is destroyed, which has a great influence on the LBP features. In order to solve the influence of uneven illumination on the stability of LBP, the present disclosure performs gamma correction on the image before extracting the vein feature, which reduces the influence of illumination, and enhances the robustness of LBP operator.

Because the LBP algorithm is simple, the extracted texture features have low dimensionality, and the acquired vein features have too many dimensions, containing a lot of redundant information, the direct use thereof will lead to an excessive calculation amount and low recognition efficiency. Especially in the application scenario of 1:N, as the number N of registered users accumulates continuously, the authentication time of finger vein recognition system increases and the user experience decreases. The present disclosure applies the 2DPCA dimension reduction mechanism to carry out dimension reduction treatment on the LBP feature, so that the feature expression is more compact and the calculation intensity is reduced; through using the trained SVM model for classification and recognition, the accuracy of recognition is improved stably and the speed of recognition is improved obviously, so the user experience is enhanced.

Figure 7:
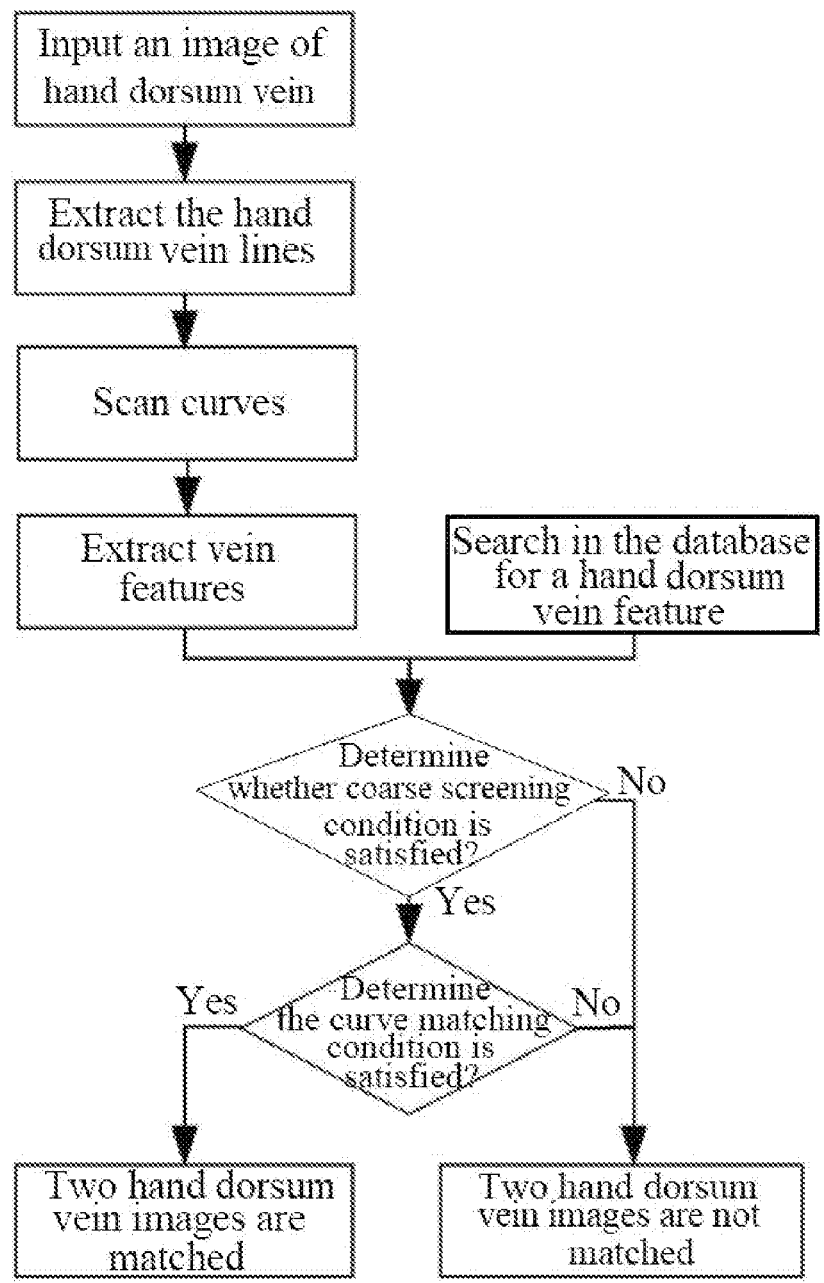
FIG. 7 is a flowchart of a vein feature matching method according to the present disclosure.

Furthermore, the present disclosure also provides a method for matching hand dorsum veins based on curve matching. As shown in FIG. 7, firstly, the vein branch curves are scanned according to the end points and intersection points of vein lines, then features such as the curvature and length on each curve are extracted, finally, the reliable identification of hand dorsum vein is realized by combining the coarse screening and curve matching; under the premise of enhancing the anti-interference ability of features, the ability of distinguishing between classes of features is improved to realize reliable recognition of the hand dorsum vein. This method overcomes the effect of sample rotation and translation on recognition, speeds up the matching speed and improves the efficiency.

Finally, the present disclosure further provides a use method of an intelligent lock, which is applied to the above intelligent lock, including: placing the hand dorsum naturally in the acquisition space of the intelligent lock; acquiring and recognizing, by the hand dorsum vein recognition module, the image of the hand dorsum vein, so as to obtain the target vein feature data; matching, by the main controller, the target vein feature data with the recorded vein feature data to obtain the matching result; driving, by the lock drive module, the lock body to unlock in case of the successful match.

In summary, the present disclosure has the following advantages.

Firstly, the intelligent lock and use method thereof according to the present disclosure are based on the feature extraction and recognition of the hand dorsum vein. Compared with the finger vein, the hand dorsum vein is richer in feature, less affected by the rotation change, and stronger in significance and robustness. Compared with the palm vein, the palm vein is easy to be interfered by palm print, and the acquisition sharpness is poor; and due to the uneven palm surface, the palm vein is prone to deformation, while the hand dorsum vein does not have the above problems.

Secondly, the intelligent lock structure designed by the present disclosure enables the user to open the door only by lifting the hand dorsum for recognition, conforms to ergonomics and is convenient to use.

Thirdly, the present disclosure adopts the 760 nm and 960 nm near infrared bands which are low in light intensity and favorable for the vein absorption in the sunlight as the imaging light source, and filters the light of the non-imaging wavelengths by providing the narrow-band near infrared-transmitting filtering component, so as to avoid interference and contamination of the imaged vein information in the case of high natural light or other near infrared radiance. Therefore, the present disclosure can also improve the effect of vein recognition.

Embodiments of the present specification are described in a progressive manner, each embodiment focuses on the difference from other embodiments, and the same and similar parts between the embodiments may refer to each other.

In this specification, specific examples are used for illustration of the principles and implementations of the present disclosure. The description of the foregoing embodiments is used to help illustrate the method of the present disclosure and the core ideas thereof. In addition, those of ordinary skill in the art can make various modifications in terms of specific implementations and the scope of application in accordance with the ideas of the present disclosure. In conclusion, the content of this specification shall not be construed as limitations to the present disclosure.

What is claimed is:

1. An intelligent lock, comprising a lock body, a main controller, a hand dorsum vein recognition module, a housing, and a lock drive module; the main controller being connected to the hand dorsum vein recognition module and the lock drive module; the lock drive module being further connected to the lock body;

wherein the hand dorsum vein recognition module is positioned within the housing and configured to acquire an image of a hand dorsum vein of a target subject at a predetermined angle obliquely downward and recognize the image, so as to obtain target vein feature data;

wherein the main controller is positioned within the housing and configured to match the target vein feature data with recorded vein feature data to obtain a matching result; the matching result comprising a successful match and a failed match;

wherein the lock drive module is positioned within the housing and configured to drive the lock body to unlock in case of the successful match;

wherein the housing comprises a first side surface, a second side surface, an elevation-angled interaction surface, and a depression-angled acquisition surface;

wherein the first side surface, the second side surface and the elevation-angled interaction surface are fixed onto a door;

wherein the first side surface is opposite to the second side surface, and the first side surface and the second side surface are joined with the elevation-angled interaction surface and the depression-angled acquisition surface;

wherein the elevation-angled interaction surface is joined with the depression-angled acquisition surface, the first side surface and the second side surface, and an elevation angle of the elevation-angled interaction surface is 130°; and wherein the depression-angled acquisition surface is joined with the elevation-angled interaction surface, the first side surface and the second side surface, and a depression angle of the depression-angled acquisition surface is 150°.

2. The intelligent lock of claim 1, wherein the hand dorsum vein recognition module comprises:

an imaging light source configured to emit light of predetermined wavelengths to illuminate a hand dorsum of the target subject;

an acquisition unit configured to acquire the image of the hand dorsum vein of the target subject at the predetermined angle obliquely downward;

a light filtering component positioned below the acquisition unit and configured to filter light of non-imaging wavelengths;

a processing unit connected to the imaging light source, the acquisition unit and the main controller, configured to control the imaging light source to emit light, and further configured to recognize the image of the hand dorsum vein of the target subject to obtain the target vein feature data.

3. The intelligent lock of claim 1, further comprising:

a proximity sensor positioned on the depression-angled acquisition surface, connected to the hand dorsum vein recognition module, and configured to sense whether a hand dorsum is placed in an acquisition space and detect a distance to the hand dorsum; the acquisition space being determined by positions and angles of the hand dorsum vein recognition module and the depression-angled acquisition surface.

4. The intelligent lock of claim 1, wherein the depression-angled acquisition surface is an infrared-transmitting sealing plate.

5. The intelligent lock of claim 1, wherein the elevation-angled interaction surface comprises a touch keyboard module and an NFC card reading module; the touch keyboard module and the NFC card reading module are connected to the main controller.

6. The intelligent lock of claim 2, wherein the predetermined wavelengths comprise 760 nm and 960 nm; the light filtering component is a narrow-band near-infrared-transmitting filtering component.

7. The intelligent lock of claim 1, wherein the predetermined angle is the depression angle of 150°.

8. The intelligent lock of claim 3, wherein the proximity sensor is any one of an optical sensor, a capacitive levitated induction sensor, and a distance sensor.

9. A use method of an intelligent lock applied to an intelligent lock comprising a lock body, a main controller, a hand dorsum vein recognition module, a housing, and a lock drive module; the main controller being connected to the hand dorsum vein recognition module and the lock drive module; the lock drive module being further connected to the lock body;
wherein the hand dorsum vein recognition module is positioned within the housing and configured to acquire an image of a hand dorsum vein of a target subject at a predetermined angle obliquely downward and recognize the image, so as to obtain target vein feature data;
wherein the main controller is positioned within the housing and configured to match the target vein feature data with recorded vein feature data to obtain a matching result; the matching result comprising a successful match and a failed match;
wherein the lock drive module is positioned within the housing and configured to drive the lock body to unlock in case of the successful match;
wherein the housing comprises a first side surface, a second side surface, an elevation-angled interaction surface, and a depression-angled acquisition surface;
wherein the first side surface, the second side surface and the elevation-angled interaction surface are fixed onto a door;
wherein the first side surface is opposite to the second side surface, and the first side surface and the second side surface are joined with the elevation-angled interaction surface and the depression-angled acquisition surface;
wherein the elevation-angled interaction surface is joined with the depression-angled acquisition surface, the first side surface and the second side surface, and an elevation angle of the elevation-angled interaction surface is 130°; and
wherein the depression-angled acquisition surface is joined with the elevation-angled interaction surface, the first side surface and the second side surface, and a depression angle of the depression-angled acquisition surface is 150°;
the use method comprising:
placing the hand dorsum naturally in an acquisition space of the intelligent lock;
acquiring and recognizing, by the hand dorsum vein recognition module, the image of the hand dorsum vein, so as to obtain the target vein feature data;
matching, by the main controller, the target vein feature data with the recorded vein feature data to obtain the matching result; and
driving, by the lock drive module, the lock body to unlock in case of the successful match.

10. The use method of claim 9, wherein the hand dorsum vein recognition module comprises:
an imaging light source configured to emit light of predetermined wavelengths to illuminate a hand dorsum of the target subject;
an acquisition unit configured to acquire the image of the hand dorsum vein of the target subject at the predetermined angle obliquely downward;
a light filtering component positioned below the acquisition unit and configured to filter light of non-imaging wavelengths;
a processing unit connected to the imaging light source, the acquisition unit and the main controller, configured to control the imaging light source to emit light, and further configured to recognize the image of the hand dorsum vein of the target subject to obtain the target vein feature data.

11. The use method of claim 9, the intelligent lock further comprising:
a proximity sensor positioned on the depression-angled acquisition surface, connected to the hand dorsum vein recognition module, and configured to sense whether a hand dorsum is placed in an acquisition space and detect a distance to the hand dorsum; the acquisition space being determined by positions and angles of the hand dorsum vein recognition module and the depression-angled acquisition surface.

12. The use method of claim 9, wherein the depression-angled acquisition surface is an infrared-transmitting sealing plate.

13. The use method of claim 9, wherein the elevation-angled interaction surface comprises a touch keyboard module and an NFC card reading module; the touch keyboard module and the NFC card reading module are connected to the main controller.

14. The use method of claim 10, wherein the predetermined wavelengths comprise 760 nm and 960 nm; the light filtering component is a narrow-band near-infrared-transmitting filtering component.

15. The use method of claim 9, wherein the predetermined angle is the depression angle of 150°.

16. The use method of claim 11, wherein the proximity sensor is any one of an optical sensor, a capacitive levitated induction sensor, and a distance sensor.

* * * * *